United States Patent
Gallucci et al.

(10) Patent No.: US 6,627,303 B1
(45) Date of Patent: Sep. 30, 2003

(54) HIGH MODULUS WEATHERABLE POLYESTER CARBONATE ARTICLES

(75) Inventors: Robert R. Gallucci, Mt. Vernon, IN (US); Xiangyang Li, Mt. Vernon, IN (US); Paul D. Sybert, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/348,064

(22) Filed: Jan. 17, 2003

(51) Int. Cl.$^7$ .......................... C08L 69/00; G08F 20/00
(52) U.S. Cl. ................. 428/212; 528/190; 528/194; 528/206; 528/219; 528/298; 528/302; 528/308; 528/308.6; 525/439; 525/450; 524/442; 524/449; 428/412; 428/423.7
(58) Field of Search ................... 528/190, 194, 528/206, 219, 298, 302, 308, 308.6; 525/439, 450; 524/442, 449; 428/212, 423.7, 412

(56) References Cited

U.S. PATENT DOCUMENTS

| | | |
|---|---|---|
| 3,030,331 A | 4/1962 | Goldberg |
| 3,168,121 A | 2/1965 | Goldberg |
| 3,207,814 A | 9/1965 | Goldberg |
| 3,444,129 A | 5/1969 | Young, Jr. et al. |
| 3,460,961 A | 8/1969 | Young, Jr. et al. |
| 3,492,261 A | 1/1970 | Young, Jr. et al. |
| 3,503,779 A | 3/1970 | Young, Jr. et al. |
| 3,506,470 A | 4/1970 | Young, Jr. et al. |
| 4,127,560 A | 11/1978 | Kramer |
| 4,281,099 A | 7/1981 | Maresca |
| 4,334,053 A | 6/1982 | Freitag et al. |
| 4,414,230 A | 11/1983 | Hanabata et al. |
| 4,495,325 A | 1/1985 | DeBergalis et al. |
| 4,503,121 A | 3/1985 | Robeson et al. |
| 4,576,842 A | 3/1986 | Hartsing et al. |
| 4,643,937 A | 2/1987 | Dickinson et al. |
| 4,931,364 A | 6/1990 | Dickinson |
| 4,992,322 A | 2/1991 | Curry et al. |
| 5,030,505 A | 7/1991 | Dickinson |
| 5,064,704 A | 11/1991 | Stewart |
| 5,318,850 A | 6/1994 | Pickett et al. |
| 5,321,114 A | 6/1994 | Fontana et al. |
| 5,510,182 A | 4/1996 | Fontana et al. |
| 5,552,463 A | 9/1996 | Akkapeddi et al. |
| 5,846,659 A | 12/1998 | Lower et al. |
| 5,916,997 A | 6/1999 | Webb et al. |
| 6,087,007 A | 7/2000 | Fuijii et al. |
| 6,136,441 A | 10/2000 | MacGregor et al. |
| 6,143,839 A | 11/2000 | Webb et al. |
| 6,265,522 B1 | 7/2001 | Brunelle et al. |
| 6,291,589 B1 | 9/2001 | Brunelle et al. |
| 6,294,647 B1 | 9/2001 | Brunelle et al. |
| 6,306,507 B1 | 10/2001 | Brunelle et al. |

FOREIGN PATENT DOCUMENTS

| | | |
|---|---|---|
| EP | 0733 470 | 9/1996 |
| JP | 1-199841 | 8/1989 |
| JP | 1-201326 | 8/1989 |
| JP | 6-122756 | 5/1994 |
| WO | WO 00/26275 | 5/2000 |

OTHER PUBLICATIONS

SM Cohen et al Journal of Polymer Science: Part A–1, "Transparent Ultraviolet–Barrier Coatings," vol 9. pp. 3263–3299 (1971).

William M. Eareckson III, Journal of Polymer Science, "Interfacial Polycondensation X Polyphenyl Esters," vol. XL, pp. 399–406, 1959.

*Primary Examiner*—Samuel A. Acquah

(57) ABSTRACT

Articles made from a thermoplastic resin composition comprising a high modulus fiber and a resorcinol polyester or resorcinol polyester carbonate resin showing high strength and stiffness along with surprisingly good retention of gloss and color when exposed to weathering.

16 Claims, No Drawings

HIGH MODULUS WEATHERABLE POLYESTER CARBONATE ARTICLES

FIELD OF THE INVENTION

This invention relates to article with high stiffness and strength having high retention of color and gloss when exposed to weathering.

BACKGROUND OF THE INVENTION

Fiber reinforced thermoplastic resins have long been used in a wide variety of applications. The combination of rigid fibers, especially glass fibers, with thermoplastic polymers has joined the easy molding and forming of recyclable plastics with the strength and stiffness of the fiber.

However one drawback to this combination is the poor weathering of the fiber resin combination when used in outdoor applications. After a relatively short period of time the surface of fiber filled thermoplastic articles begin to erode. The erosion process exposes the fiber giving an article that has poor appearance and may no longer serve its intended purpose. For example a surface designed for seating will become uncomfortable as glass fibers begin to protrude from its surface as a result of weathering. Similarly a rigid part designed to carry a load in a structural application may alter its appearance due to loss of gloss or changes of color as the thermoplastic resin weathers to expose the glass fibers in the mixture. Changes in gloss and color may often make the article unacceptable for its intend use.

Fiber reinforced plastics (FRP), when exposed to outdoor weathering, often suffer loss of gloss, discoloration and loss of strength. Poor FRP weathering is thought to occur mainly due to the following reasons. First, fiber and polymer resin do not erode at the same rate, with weathering the surface of the FRP is roughened, leading to loss of gloss and exposing fibers. Second, UV induced degradation of the resin surface leads to crazing and erosion, exposing the fiber. The fibers exposed at the surface and create multiple wicking sites which allow moisture to penetrate beneath the exposed surface of the article formed from the polymer resin fiber mixture. The moisture absorbed may further reduce the interfacial bonding between the resin matrix and the individual reinforcing fibers, resulting loss of strength. Third, photochemical induced degradation of the resin also often leads to discoloration. The loss of gloss due to unequal rate of erosion is a problem of FRP.

The traditional method to address the problem of erosion of the surface of weathering articles formed from fiber filled thermoplastic resins is to apply a coating or protective layer. To address the poor weatherability of FRP, U.S. Pat. No. 4,369,224 teaches application of a gel coat to the surface of FRP product to provide resistance to the deterioration from UV exposure; U.S. Pat. No. 4,117,185 teaches application of a film or a layer of fluoro-plastic materials to provide the resistance to weathering.

This approach is effective, paints or thin films are very commonly used to protect plastic parts used in outdoor applications. However, application of such coatings adds complexity and cost to the article. In addition the issue of coating adhesion to the fiber filled resin substrate must be addressed. Despite many inventions in the area, loss of protective coatings is still common.

SUMMARY OF THE INVENTION

We have found that articles made from a combination of fibers with a specific resorcinol based polyester resins have high strength and stiffness, as indicated by flexural strength and modulus with surprisingly good retention of color and gloss when exposed to weathering.

Even though the fiber and the resorcinol based polyester resin: should have different erosion rates, the invented articles defy the expected observation, showing excellent weatherability in terms of gloss retention and resistance to discoloration compared with the similar compositions based on polycarbonate resins.

DETAILED DESCRIPTION OF THE INVENTION

The composition of the invention may comprise from 1–60% by weight of the composition of fiber. Any rigid fiber may be used for example, glass fibers, carbon fibers, metal fibers, ceramic fibers or whiskers. Preferred fibers will not add color when combined to the polycarbonate ester resin. In one embodiment of the invention glass fibers are employed. In other embodiments of the invention borosilicate glass fibers are used Preferred fibers of the invention will have modulus of grater than or equal to 1,000,000 psi. The fiber may be chopped or continuous. The fiber may have various cross-sections for example, round, crescent, bilobal, trilobal, rectangular and hexagonal.

Preferred fibers will have a diameter of from 5–25 microns with diameter of 6–17 microns being most preferred. In some applications it may be desirable to treat the surface of the fiber with a chemical coupling agent to improve adhesion to the polyester carbonate resin. Examples of useful coupling agents are alkoxy silanes and alkoxy zirconates. Amino, epoxy, amide, or thio functional alkoxy silanes are especially useful.

The composition of the invention will further comprise 99–40% by weight of the entire mixture of a resorcinol based polyarylate resin. The resin should contain at least 30 mole % of units derived from the reaction product of resorcinol, or functionalized resorcinol, with an aryl dicarboxylic acid or dicarboxylic acid derivatives suitable for the formation of aryl ester linkages, for example, carboxylic acid halides, carboxylic acid esters and carboxylic acid salts.

The resorcinol based polyarylate may further contain carbonate linkages derived from reaction of a bisphenol and a carbonate forming species, such as phosgene. In another embodiment of the invention resorcinol polyarylate carbonate copolymers will be comprised of the reaction products of iso and tere phthalic acid, resorcinol and optionally, bisphenol A and phosgene. The resorcinol polyester carbonate copolymer will be made in such a way that the number of bisphenol dicarboxylic ester linkages is minimized, for example by pre-reacting the resorcinol moiety with the dicarboxylic acid moiety to form a polyester block and then reacting a said block with the bisphenol and carbonate moiety to form the polycarbonate part of the copolymer.

Most preferred compositions will have 60–90% resorcinol based polyester with from 10–40% glass fiber.

In one of its aspects the article of the present invention is comprised of polymers containing arylate polyester chain members. Said chain members comprise at least one diphenol residue in combination with at least one aromatic dicarboxylic acid residue. In one embodiment the diphenol residue is derived from a 1,3-dihydroxybenzene moiety, as illustrated in Formula I, commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

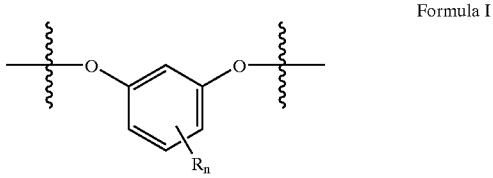

Formula I

In Formula I R is at least one of $C_{1-12}$ alkyl, $C_6$–$C_{24}$ aryl, alkyl aryl or halogen, and n is 0–3.

Suitable dicarboxylic acid residues include aromatic dicarboxylic acid residues derived from monocyclic moieties. In various embodiments suitable dicarboxylic acid residues include those derived from isophthalic acid, terephthalic acid, or mixtures of isophthalic and terephthalic acids. Suitable dicarboxylic acid residues also include those derived from polycyclic moieties, illustrative examples of which include diphenyl dicarboxylic acid, diphenylether dicarboxylic acid, and naphthalenedicarboxylic acid, especially naphthalene-2,6-dicarboxylic acid. In some embodiments the aromatic dicarboxylic acid residues are derived from mixtures of isophthalic and/or terephthalic acids as typically illustrated in Formula II.

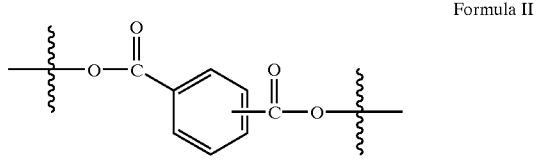

Formula II

Therefore, in one embodiment the present invention provides thermally stable polymers comprising resorcinol arylate polyester chain members as typically illustrated in Formula III wherein R and n are as previously defined:

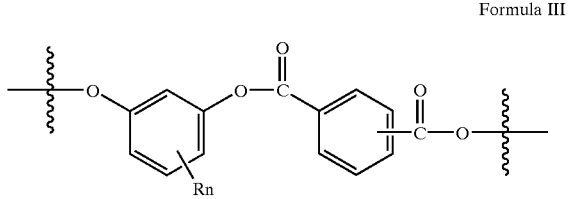

Formula III

In one of its aspects the present invention provides an article made of a resin prepared using an interfacial polymerization method preparing polymers comprising resorcinol arylate polyester chain members substantially free of anhydride linkages, said method comprising a first step of combining at least one resorcinol moiety and at least one catalyst in a mixture of water and at least one organic solvent substantially immiscible with water. Suitable resorcinol moieties comprise units of Formula V:

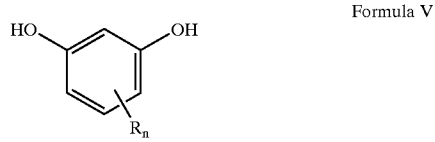

Formula V wherein R is at least one of $C_{1-12}$ alkyl, $C_6$–$C_{24}$ aryl, alkyl aryl or halogen, and n is 0–3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, isobutyl, t-butyl, hexyl, cyclohexyl, nonyl, decyl, and aryl-substituted alkyl, including benzyl. In a particular embodiment an alkyl group is methyl. Suitable halogen groups are bromo, chloro, and fluoro. The value for n in various embodiments may be 0–3, in some embodiments 0–2, and in still other embodiments 0–1. In one embodiment a resorcinol moiety is 2-methylresorcinol. In another embodiment the resorcinol moiety is an unsubstituted resorcinol moiety in which n is zero. The method further comprises combining at least one catalyst with the reaction mixture. Said catalyst may be present in various embodiments at a total level of 0.1 to 10 mole %, and in some embodiments at a total level of 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N—$C_1$–$C_6$-alkyl-pyrrolidines, such as N-ethylpyrrolidine, N—$C_1$–$C_6$-piperidines, such as N-ethylpiperidine, N-methylpiperidine, and N-isopropylpiperidine, N—$C_1$–$C_6$-morpholines, such as N-ethylmorpholine, and N-isopropyl-morpholine, N—$C_1$–$C_6$-dihydroindoles, N—$C_1$–$C_6$-dihydroisoindoles, N—$C_1$–$C_6$-tetrahydroquinolines, N—$C_1$–$C_6$-tetrahydroisoquinolines, N—$C_1$–$C_6$-benzo-morpholines, 1-azabicyclo-[3.3.0]-octane, quinuclidine, N—$C_1$–$C_6$-alkyl-2-azabicyclo-[2.2.1]-octanes, N—$C_1$–$C_6$-alkyl-2-azabicyclo-[3.3.1]-nonanes, and N—$C_1$–$C_6$-alkyl-3-azabicyclo-[3.3.1]-nonanes, N,N,N',N'-tetraalkylalkylenediamines, including N,N,N',N'-tetraethyl-1,6-hexanediamine. In various embodiments tertiary amines are triethylamine and N-ethylpiperidine.

Suitable dicarboxylic acid dihalides may comprise aromatic dicarboxylic acid dichlorides derived from monocyclic moieties, illustrative examples of which include isophthaloyl dichloride, terephthaloyl dichloride or mixtures of isophthaloyl and terephthaloyl dichlorides. Suitable dicarboxylic acid dihalides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, especially naphthalene-2,6-dicarboxylic acid dichloride; or from mixtures of monocyclic and polycyclic aromatic dicarboxylic acid dichlorides. In one embodiment the dicarboxylic acid dichloride comprises mixtures of isophthaloyl and/or terephthaloyl dichlorides as typically illustrated in Formula VI.

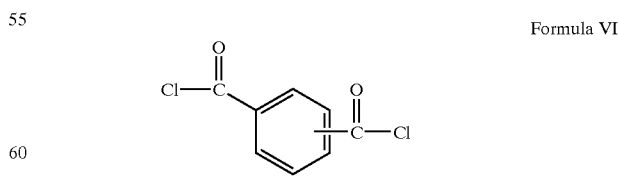

Formula VI

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25–4.0:1; in other embodiments the molar ratio is about 0.4–2.5:1; and in still other embodiments the molar ratio is about 0.67–1.5:1.

Dicarboxylic acid halides provide only one method of preparing the polymers on the invention. Other routes to make the resorcinol arylate linkages are also contemplated using, for example, the dicarboxylic acid; a dicarboxylic acid ester, especially an activated ester, or dicarboxylate salts or partial salts.

At least one chain-stopper (also referred to sometimes hereinafter as capping agent) may also be present in the method and compositions of the invention. A purpose of adding at least one chain-stopper is to limit the molecular weight of polymer comprising resorcinol arylate polyester chain members, thus providing polymer with controlled molecular weight and favorable processability. Typically, at least one chain-stopper is added when the resorcinol arylate-containing polymer is not required to have reactive end-groups for further application. In the absence of chain-stopper resorcinol arylate-containing polymer may be either used in solution or recovered from solution for subsequent use such as in copolymer formation which may require the presence of reactive end-groups, typically hydroxy, on the resorcinol-arylate polyester segments. A chain-stopper may be at least one of mono-phenolic compounds, mono-carboxylic acid chlorides, and/or mono-chloroformates. Typically, the at least one chain-stopper may be present in quantities of 0.05 to 10 mole %, based on resorcinol moieties in the case of mono-phenolic compounds and based on acid dichlorides in the case mono-carboxylic acid chlorides and/or mono-chloroformates.

Suitable mono-phenolic compounds include monocyclic phenols, such as phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. In some embodiments mono-phenolic chain-stoppers are phenol, p-cumylphenol, and resorcinol monobenzoate.

Suitable mono-carboxylic acid chlorides include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof. A chain-stopper can be combined together with the resorcinol moieties, can be contained in the solution of dicarboxylic acid dichlorides, or can be added to the reaction mixture after production of a precondensate. If mono-carboxylic acid chlorides and/or mono-chloroformates are used as chain-stoppers, they are often introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added in one embodiment to the reaction mixture during the reaction, or, in another embodiment, before the beginning of the reaction between resorcinol moiety and acid chloride moiety. When hydroxy-terminated resorcinol arylate-containing precondensate or oligomers are prepared, then chain-stopper may be absent or only present in small amounts to aid control of oligomer molecular weight.

In another embodiment the invention may encompass the inclusion of at least one branching agent such as a trifunctional or higher functional carboxylic acid chloride and/or trifunctional or higher functional phenol. Such branching agents, if included, can typically be used in quantities of 0.005 to 1 mole %, based on dicarboxylic acid dichlorides or resorcinol moieties used, respectively. Suitable branching agents include; for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties whilst acid chloride branching agents may be introduced together with acid dichlorides.

In one of its embodiments the invention comprises thermally stable resorcinol arylate polyesters made by the present method and substantially free of anhydride linkages linking at least two mers of the polyester chain. In a particular embodiment said polyesters comprise dicarboxylic acid residues derived from a mixture of iso- and terephthalic acids as illustrated in Formula VII:

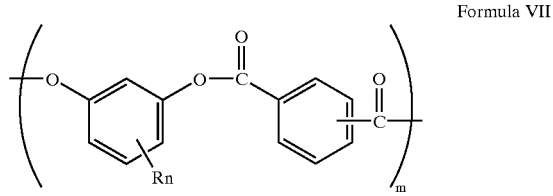

Formula VII wherein R is at least one of $C_{1-12}$ alkyl, $C_6$–$C_{24}$ aryl, alkyl aryl or halogen, n is 0–3, and m is at least about 8. In various embodiments n is zero and m is between about 10 and about 300. The molar ratio of isophthalate to terephthalate is in one embodiment about 0.25–4.0:1, in another embodiment about 0.4–2.5:1, and in still another embodiment about 0.67–1.5:1. Substantially free of anhydride linkages means that said polyesters show decrease in molecular weight in one embodiment of less than 30% and in another embodiment of less than 10% upon heating said polymer at a temperature of about 280–290° C. for five minutes.

Also included in the scope of this invention are resorcinol arylate copolyesters containing soft-block segments as disclosed in commonly owned U.S. Pat. No. 5,916,997. The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas I, VIII, and IX:

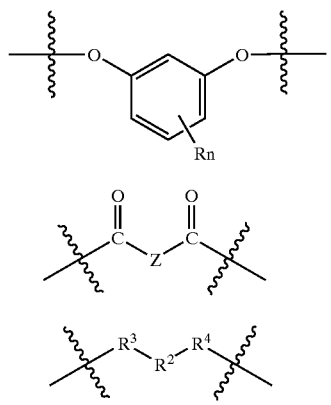

Formula I

Formula VIII

Formula IX wherein R and n are as previously defined, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

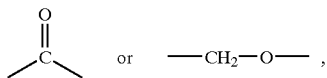

or —$CH_2$—O—, wherein Formula IX contributes from about 1 to about 45 mole percent to the ester linkages of the polyester. Additional embodiments of the present invention provide a composition wherein Formula IX contributes in various embodiments from about 5 to about 40 mole percent to the ester linkages of the polyester, and in other embodiments from about 5 to about 20 mole percent to the ester linkages of the polyester. Another embodiment provides a composition wherein $R^2$ represents in one embodiment $C_{3-14}$ straight chain alkylene, or $C_{5-6}$ cycloalkylene, and in another embodiment $R^2$ represents $C_{3-10}$ straight-chain alkylene or $C_6$-cycloalkylene. Formula VIII represents an aromatic dicarboxylic acid residue. The divalent aromatic radical Z in Formula VIII may be derived in various embodiments from at least one of the suitable dicarboxylic acid residues as defined hereinabove, and in some embodiments at least one of 1,3-phenylene, 1,4-phenylene, or 2,6-naphthylene. In various embodiments Z comprises at least about 40 mole percent 1,3-phenylene. In various embodiments of copolyesters containing soft-block chain members n in Formula I is zero.

In various embodiments copolyesters containing resorcinol arylate chain members are those comprising from about 1 to about 45 mole % sebacate or cyclohexane-1,4-dicarboxylate units. In a particular embodiment a copolyester containing resorcinol arylate chain members is one comprising resorcinol isophthalate and resorcinol sebacate units in molar ratio between 8.5:1.5 and 9.5:0.5. In one embodiment said copolyester is prepared using sebacoyl chloride in combination with isophthaloyl dichloride.

In another of its embodiments the present invention comprises block copolyestercarbonates comprising resorcinol arylate-containing block segments in combination with organic carbonate block segments. The segments comprising resorcinol arylate chain members in such copolymers are substantially free of anhydride linkages. Substantially free of anhydride linkages means that the copolyestercarbonates show decrease in molecular weight in one embodiment of less than 10% and in another embodiment of less than 5% upon heating said copolyestercarbonate at a temperature of about 280–290° C. for five minutes. The block copolyestercarbonates include those comprising alternating arylate and organic carbonate blocks, typically as illustrated in Formula X, wherein R and n are as previously defined, and $R^5$ is at least one divalent organic radical:

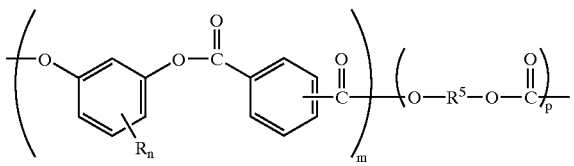

Formula X

The arylate blocks have a degree of polymerization (DP), represented by m, in one embodiment of at least about 4, in another embodiment of at least about 10, in another embodiment of at least about 20 and in still another embodiment of about 30–150. The DP of the organic carbonate blocks, represented by p, is in one embodiment generally at least about 10, in another embodiment at least about 20 and in still another embodiment about 50–200. The distribution of the blocks may be such as to provide a copolymer having any desired weight proportion of arylate blocks in relation to carbonate blocks. In general, the content of arylate blocks is in one embodiment about 10–95% by weight and in another embodiment about 50–95% by weight.

Although a mixture of iso- and terephthalate is illustrated in Formula X, the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In various embodiments n is zero and the arylate blocks comprise dicarboxylic acid residues derived from a mixture of iso- and terephthalic acid residues, wherein the molar ratio of isophthalate to terephthalate is in one embodiment about 0.25–4.0:1, in another embodiment about 0.4–2.5:1, and in still another embodiment about 0.67–1.5:1.

In the organic carbonate blocks, each $R^5$ is independently a divalent organic radical. In various embodiments said radical comprises at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1 H-indan]) and similar radicals such as those which correspond to the dihydroxy-substituted aromatic hydrocarbons disclosed by name or formula (generic or specific) in U.S. Pat. No. 4,217,438.

In some embodiments each $R^5$ is an aromatic organic radical and in other embodiments a radical of Formula XI:

Formula XI

—$A^1$—Y—$A^2$— wherein each $A^1$ and $A^2$ is a monocyclic divalent aryl radical and Y is a bridging radical in which one or two carbon atoms separate $A^1$ and $A^2$. The free valence bonds in Formula XI are usually in the meta or para positions of $A^1$ and $A^2$ in relation to Y. Compounds in which $R^5$ has Formula XI are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula XI, $A^1$ and $A^2$ typically represent unsubstituted phenylene or substituted derivatives thereof, illustrative substituents (one or more) being alkyl, alkenyl, and halogen (particularly bromine). In one embodiment unsubstituted phenylene radicals are preferred. Both $A^1$ and $A^2$ are often p-phenylene, although both may be o- or m-phenylene or one o- or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

In some embodiments gem-alkylene (commonly known as "alkylidene") radicals are preferred. Also included, however, are unsaturated radicals. In some embodiments the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments of the invention carbonate blocks of Formula X may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of (a) an ester linkage between a suitable dicarboxylic acid residue of an arylate moiety and an —O—$R^5$—O— moiety of an organic carbonate moiety, for example as typically illustrated in Formula XII, wherein $R^5$ is as previously defined:

Formula XII

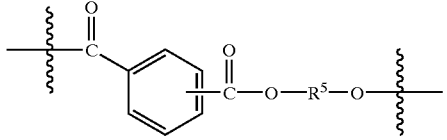

and (b) a carbonate linkage between a diphenol residue of a resorcinol arylate moiety and a —(C=O)—O— moiety of an organic carbonate moiety as shown in Formula XIII, wherein R and n are as previously defined:

Formula XIII

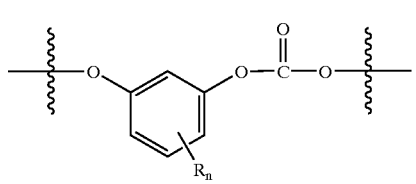

The presence of a significant proportion of ester linkages of the type (a) may result in undesirable color formation in the copolyestercarbonates. Although the invention is not limited by theory it is believed that color may arise, for example, when $R^5$ in Formula XII is bisphenol A and the moiety of Formula XII undergoes Fries rearrangement during subsequent processing and/or light-exposure. In one embodiment the copolyestercarbonate is substantially comprised of a diblock copolymer with a carbonate linkage between resorcinol arylate block and an organic carbonate block. In another embodiment the copolyestercarbonate is substantially comprised of a triblock carbonate-ester-carbonate copolymer with carbonate linkages between the resorcinol arylate block and organic carbonate end-blocks.

Copolyestercarbonates with at least one carbonate linkage between a thermally stable resorcinol arylate block and an organic carbonate block are typically prepared from resorcinol arylate-containing oligomers prepared by various embodiments of the invention and containing in one embodiment at least one and in another embodiment at least two hydroxy-terminal sites. Said oligomers typically have weight average molecular weight in one embodiment of about 10,000 to about 40,000, and in another embodiment of about 15,000 to about 30,000. Thermally stable copolyestercarbonates may be prepared by reacting said resorcinol arylate-containing oligomers with phosgene, at least one chain-stopper, and at least one dihydroxy-substituted aromatic hydrocarbon in the presence of a catalyst such as a tertiary amine.

Resorcinol based polyester fiber compositions as described above show improved resistance to weathering under a variety of conditions, for example, natural outdoor weathering with high and low humidity, for example in Florida or Arizona. For ease of testing weathering is often simulated under various accelerated test conditions, for example ASTMG26, ASTM G155 or SAE J1960.

In one embodiment of the invention samples were exposed to weathering in an Atlas Ci4000 xenon arc weatherometer equipped with CIRA glass inner and a sodalime glass outer filters at an irradiance of 0.77 watts per square meter at 340 nanometers. Exposure conditions were black panel 55° C., dry bulb 35° C., humidity 30% with continuous illumination. Exposure was measured in kilojoules per square meter (KJ/m$^2$) of energy received at 340 nanometers. The samples were exposed to a rain like water spray weekly and wiped with a sponge. Light was left on continuously. Under these aging conditions; 2.7 KJ/m$^2$=~1 hour of exposure: 1000 hr. equals about 2700 KJ/m$^2$, 3000 hr. equals about 8100 KJ/m$^2$, 5000 hr. equals about 13,500 KJ/m$^2$.

CIRA is an IR reflecting quartz filter manufactured by Atlas Electric Devices Co. It stands for "Coated InfraRed Absorbing" quartz. The combination of this filter with a soda lime glass outer filter gives a short wavelength UV cut-off very similar to natural Miami sunlight and reduces slightly the heat load on the samples thus allowing temperature control at higher irradiances than without the IR coating.

Color shift measurements may be measured using the CieLAB system using L, a, b values to calculate a color shift: delta E, compared to an unweathered control. Samples were evaluated for color on a GretagMacbeth™ Color-Eye 7000A colorimeter with results reported as $\Delta E$ (($\Delta E = \Delta L^2 + \Delta a + \Delta b^2)^{1/2}$). The change in the color of the weathered samples compared to the initial unweathered samples was also measured by the change in yellowness index (YI), according to ASTM D1925.

Surface gloss, often measured as 60 degree gloss values using ASTM D523, can also be monitored as a function of exposure time under normal weathering or in an accelerated weathering apparatus ("weatherometer") to determine resistance of a material to loss of properties due to photo-aging under the conditions described above. Gloss was measured at a 60 degree angle on the samples as they emerged form weathering using a BykGardner microTrigloss meter calibrated against a black glass standard.

Samples which have an initially high gloss, for example greater than about 50 degrees, will show changes in reflectivity more readily than samples which have a low initial gloss.

Articles of the invention will have high gloss as molded, that is with a 60 degree gloss of greater than or equal to 70%, most preferred with a gloss of greater than or equal to 80%, and will show greater than or equal to 50% retention of said initial gloss after 1000 KJ/m2 of accelerated weathering under the accelerated photoaging test conditions described herein. The preferred compositions of the invention will show about 50% retention of initial gloss after 3000 $KJ/m^2$ of accelerated weathering. The most preferred compositions of the invention show 50% or greater retention of the initial gloss after 5000 $KJ/m^2$ of accelerated weathering. The higher the total exposure energy, measured in $KJ/m^2$ the more severe the test becomes and the more difficult it becomes for an article to retain its, gloss, color or properties.

The composition of the invention can also be combined with other ingredients such as mineral fillers; for example, talc, clay, mica, barite, wollastonite, silica, milled glass and glass flake. Colorants such as titanium dioxide, zinc sulfide and carbon black; stabilizers such as hindered phenols, aryl phosphates and aryl phosphinates and thioesters, as well as mold release agents, lubricants, flame retardants, smoke suppressors, ultra violet absorbers and other uv stabilizers anti-drip agents, for instance those based on fluoro polymers, can also be added to the composition in effective amounts.

In some embodiments of the invention combinations of glass fibers with a flat, plate like filler, for example mica or flaked glass, wherein the flat, plate like filler, has a length and width at least ten times greater than its thickness, where the thickness is from 1–1000 microns may give enhanced properties.

Combinations of rigid fibrous fillers with flat, plate like fillers may reduce warp of the molded article. Preferred mold release agents are alkyl carboxylic acid esters, for example, penta erythritol tetrastearate, glycerin tristearate and ethylene glycol distearate. Mold release agents are typically present in the composition at 0.05–0.5% by weight of the formulation. Preferred mold release agents will have high molecular weight, typically greater than about 300, to prevent loss if the release agent from the molten polymer fiber mixture during melt processing.

Preferred flame retardant additives include halogenated compounds especially aromatic chlorine or bromine containing compounds, sulfonate salts, for example potassium sulfone sulfonate and per fluoro butyl sodium sulfonate. Aryl phosphate flame retardants for example, triphenyl phosphate as well as phosphate esters of bisphenol A or resorcinol are also useful flame retardants. Flame retardant compositions may also contain: polymers made from fluorinated olefin monomers, for example poly tetra fluoro ethylene, to retard dripping during buming.

Articles of the invention can be prepared by any number of methods. Preferred methods include, for example, injection molding, compression molding, profile extrusion, sheet or film extrusion, gas assist molding, structural foam molding and thermoforming. Injection molding wherein the article has an inner core of one type of resin and an outer covering of the resorcinol based polyester is also contemplated as a means of making articles. Such multi component molding is often called co-injection molding.

Useful articles of the invention include, for example, benches, seating, doors, window frames, outdoor lighting, transport devices, structural and decorative components of buildings, green houses, siding materials, architectural hardware, mail boxes, post, fencing, enclosures and communication equipment.

Further useful examples of the invention include articles made for use in the following applications: aircraft, automotive vehicle, truck, water-borne vehicle or motorcycle exterior or interior component: an enclosure housing, panel, or part for an outdoor vehicle or outdoor device; an enclosure for an electrical or telecommunication device; outdoor furniture; an article for boat or marine equipment, trim, enclosures, and housings; an outboard motor housing; a depth finder housing; a personal water-craft; a jet-ski; a pool; a spa; a hot-tub; a step; a step covering; a building or construction application glazing, roofs, windows, floors, decorative window furnishings or treatments; display items; a wall panel, or door; an outdoor or indoor sign; a part for automatic teller machines (ATM); an enclosure, housing, panel, or part for tractors or farm equipment, irrigation devices, lawn mowers, or tools, lawn and garden tools; an article of sports equipment or a toy; an enclosure, housing, panel, or part for a snowmobile; a recreational vehicle panel or component; an article of playground equipment; an article made from combinations of plastic and wood; a golf course marker; a utility pit cover; a computer housing; a computer housing; a portable computer housing; a laptop computer housing; a palm-held computer housing; a monitor housing; a keyboard; a telephone housing; a mobile phone housing; a radio sender housing; a radio receiver housing; a light fixture; a lighting appliance; a network interface device housing; a transformer housing; an air conditioner housing; seating for public transportation, trains, subways, or buses; a meter housing; an antenna housing; an article fabrication of satellite dishes; a helmet or other article of personal protective equipment.

EXAMPLES OF THE INVENTION

Examples 1–6

Table 1 shows the examples of the invention 1–6 and control examples A and B. The ingredients of each formulation were mixed together and melt blended on a vacuum vented 2.5 in. single screw extruder at ~575° F. and ~80 rpm to give blends which were extruded into strands, cooled and chopped into pellets. The pellets were subsequently dried and injection molded into ⅛ inch thick test specimens. Tests shown in Tables 1 were conducted as follows: Flexural properties; ASTM D790, Izod Impact; ASTM D256 and heat distortion temperature (HDT) as ASTM D648.

Gloss was measured using a BykGardner microTrigloss meter at 60 degrees calibrated against a black glass standard on the samples, as they emerged form weathering, using method ASTM D523.

Yellowness Index (YI) was measured on the same samples using method ASTM D1926.

R-PEC is a resorcinol based polyester carbonate consisting of 90 mole % units based on reaction of resorcinol with a mixture of iso and terephthalic acid chloride and about 10 mole % units based on reaction of phosgene with bis phenol A. Mw equals about 25,000 daltons.

BPA-PC is a polycarbonate based on reaction of bisphenol A with phosgene Mw equals about 30,000 daltons. It is sold commercially be General Electric Plastics as LEXAN resin.

GF-1 is a chopped borosilicate glass fiber with a surface treatment comprising an aliphatic polyurethane and an amino silane. Fiber diameter is about 14 microns. It is sold commercially by Owens Coming Co. as OC473A GF-2 is a similar borosilicate chopped glass fiber with a surface treatment comprising a poly epoxy and an amino silane. It is sold commercially by Owens Coming Co. as OC473A.

Both glass fibers have a tensile modulus of about 10,500,000 psi and a tensile strength of about 500,000 psi.

Injection molded plaques of examples 1–6 and A & B were weathered in an Atlas Ci4000 xenon arc weatherometer equipped with CIRA glass inner and a sodalime glass outer filters at an irradiance of 0.77 watts per square meter at 340 nanometers. A xenon arc bulb was used as the source of light. Exposure conditions were black panel 55° C., dry bulb 35° C., humidity 30% with continuous illumination. Exposure was measured in kilojoules per square meter ($KJ/m^2$) of energy received at 340 nanometers. Under these aging conditions; 2.7 $KJ/m^2$=~1 hour of exposure: 1000 hr. equals about 2700 $KJ/m^2$, 3000 hr. equals about 8100 $KJ/m^2$, 5000 hr. equals about 13,500 $KJ/m^2$. The samples were exposed to a rain like water spray weekly and wiped with a sponge. Light was left on continuously.

CIRA is an IR reflecting quartz filter manufactured by Atlas Electric Devices Co. CIRA stands for "Coated Infra-Red Absorbing" quartz. The combination of this filter with a soda lime glass outer filter gives a short wavelength UV cut-off very similar to natural Miami sunlight and reduces slightly the heat load on the samples thus allowing temperature control at higher irradiances than without the IR coating.

Color shift measurements may be measured using the CieLAB system using L, a, b values to calculate a color shift: delta E, compared to an unweathered control. Samples were evaluated for color on a GretagMacbeth™ Color-Eye 7000A colorimeter with results reported as $\Delta E$ ($(\Delta E = \Delta L^2 + \Delta a^2 + \Delta b^2)^{1/2}$). The change in the color of the weathered samples compared to the initial unweathered samples was also measured by the change in yellowness index ($\Delta YI$), according to ASTM D1925.

Surface gloss, measured as 60 degree gloss values using ASTM D523, was also monitored as a function of exposure time under in the accelerated weathering apparatus to determine resistance of a material to loss of gloss due to aging under the conditions described above. Gloss was measured at a 60 degree angle on the samples as they emerged form weathering using a BykGardner microTrigloss meter calibrated against a black glass standard. Note that examples 1–6 of the invention show high flexural strength, greater than 20,000 psi and high flexural modulus, greater than 400,000 psi.

The example of the invention also show high initial 60 degree gloss and after irradiance for over 3000 $KJ/m^2$ show high retention of the initial gloss. The control examples A and B show low initial gloss and a rapid loss of gloss under the same conditions of weathering.

In a similar fashion the yellowness index (YI) of examples 1–6 show very little change on accelerated weathering while the control examples (A & B) more than double their initial yellowness.

Also note in examples 1–6 the small delta E values indicating little change in color during accelerated weathering. The control examples A & B show a greater change on color a larger delta E.

TABLE 1

| Example | 1 | 2 | 3 | 4 | 5 | 6 | A | B |
|---|---|---|---|---|---|---|---|---|
| R-PEC | 95 | 90 | 85 | 80 | 70 | 85 | 0 | 0 |
| BPA-PC | 0 | 0 | 0 | 0 | 0 | 0 | 80 | 70 |
| GF-1 epoxy | 5 | 10 | 15 | 20 | 30 | 0 | 20 | 30 |
| GF-2 urethane | 0 | 0 | 0 | 0 | 0 | 15 | 0 | 0 |
| Flex Mod. Kpsi | 465 | 586 | 730 | 886 | 1260 | 744 | 800 | 1100 |
| Flex Str. Kpsi | 20.2 | 23.6 | 26.9 | 29.8 | 33.5 | 26.9 | 19 | 23 |
| HDT @ 264 psi oC | 125 | 129 | 132 | 133 | 134 | 131 | 149 | 152 |
| HDT @ 66 psi oC | 134 | 136 | 137 | 138 | 138 | 137 | 146 | 146 |
| N. Izod ft-lbs/in | 1.2 | 1.2 | 1.6 | 1.8 | 2.3 | 1.4 | 2.0 | 2.0 |
| UN izod ft-lbs/in | 19 | 18 | 17 | 17 | 17 | 16 | 19 | 21 |
| Gloss as molded | 96 | 93 | 89 | 76 | 81 | 90 | 26 | 22 |
| Gloss 1274 KJ/m2 | 103 | 100 | 93 | 75 | 70 | 95 | 21 | 17 |
| Gloss 2231 KJ/m2 | 103 | 99 | 90 | 71 | 65 | 92 | 22 | 9 |
| Gloss 3016 KJ/m2 | 104 | 98 | 90 | 71 | 62 | 91 | 13 | 3 |
| Gloss 5486 KJ/m2 | 104 | 98 | 86 | 65 | 52 | 88 | 6 | 2 |
| % Retention of gloss | 100% | 100% | 97% | 86% | 64% | 98% | 23% | 9% |
| YI as molded | 26 | 29 | 30 | 28 | 20 | 31 | 19 | 14 |
| YI 1274 KJ/m2 | 25 | 28 | 30 | 28 | 20 | 28 | 25 | 19 |
| YI 2231 KJ/m2 | 24 | 27 | 29 | 28 | 23 | 28 | 29 | 26 |
| YI 3016 KJ/m2 | 26 | 29 | 30 | 28 | 20 | 28 | 34 | 29 |
| YI 5486 KJ/m2 | 25 | 28 | 30 | 28 | 22 | 29 | 39 | 36 |
| % Change in YI | 4% | 3% | 0% | 0% | 10% | 6% | 105% | 157% |
| Delta E as molded | 0 | 0 | 0 | 0 | 0 | 0 | 0 | 0 |
| Delta E 1274 KJ/m2 | 1.8 | 1.6 | 1.7 | 1.5 | 2.3 | 1.6 | 2.9 | 2.3 |
| Delta E 2231 KJ/m2 | 1.8 | 1.6 | 1.7 | 1.5 | 2.5 | 1.2 | 4.7 | 5.5 |
| Delta E 3016 KJ/m2 | 2.3 | 1.4 | 1.5 | 1.5 | 2.6 | 1.2 | 7.1 | 7.2 |
| Delta E 5486 KJ/m2 | 2.5 | 1.9 | 2.1 | 1.7 | 3.2 | 1.5 | 9.3 | 10.4 |

What is claimed is:

1. A shaped article having high flexural modulus, high gloss retention and improved weathering comprising: 40–99% of a resorcinol based polyester, 1–60% of a fiber, wherein the composition has a flexural modulus, as measured by ASTM D790, of greater than or equal to about 300,000 psi, and wherein the composition has an initial 60 degree gloss value, measured according to ASTM D523, of greater than or equal to 70%; and wherein the composition has greater than or equal to 50% retention of said initial gloss after 3,000 $KJ/m^2$ accelerated xenon arc weathering.

2. An article of claim 1 wherein the fiber has a modulus of greater than or equal to about 1,000,000 psi.

3. An article of claim 1 wherein the fiber is a glass fiber with a diameter of 5–20 microns.

4. An article of claim 1 wherein the resorcinol based polyester content is 60–90% and the fiber content is 10–40% by weight of the entire composition.

5. An article of claim 1 wherein the resorcinol based polyester has the structure shown below:

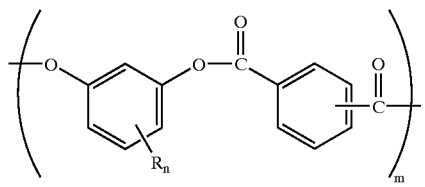

wherein R is at least one of $C_{1-12}$ alkyl, $C_6$–$C_{24}$ aryl, alkyl aryl or halogen, n is 0–3 and m is at least about 8.

6. An article of claim 1 wherein the resorcinol based polyester resin is a copolymer containing carbonate linkages.

7. An article of claim 6 wherein the resorcinol based polyester resin is a copolymer containing carbonate linkages having the structure shown below:

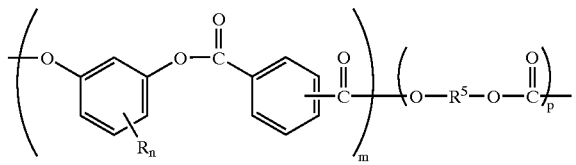

wherein R is at least one of $C_{1-12}$ alkyl, $C_6$–$C_{24}$ aryl, alkyl aryl or halogen, n is 0–3. $R^5$ is at least one divalent organic radical, m is about 4–150 and p is about 10–200.

8. An article of claim 7 wherein $R^5$ is derived from a bisphenol compound.

9. A weatherable article made of the resorcinol based polyester composition of claim 1 with an initial gloss of at least 70% that retains at least 50% retention of initial gloss after 3,000 KJ/m² accelerated weathering.

10. A weatherable article made of the resorcinol based polyester composition of claim 1 with an initial gloss of at least 70% that retains at least 50% retention of initial gloss after 5,000 KJ/m² accelerated weathering.

11. A weatherable article made of the resorcinol based polyester composition of claim 1 which has a color change of less than or equal to about 10 delta E units after 3,000 KJ/m² accelerated weathering.

12. A weatherable article made of the resorcinol based polyester composition of claim 1 further comprising a flat, plate like filler, whose length and width are at least 10 times its thickness, wherein the thickness is from 1–1000 microns.

13. A weatherable article made of the resorcinol based polyester composition of claim 12, wherein the filler is selected from the group consisting of: glass flake and mica.

14. A weatherable article made of the resorcinol based polyester composition of claim 1 further comprising an ester based mold release agent with a molecular weight of greater than or equal to about 300.

15. A weatherable article made of the resorcinol based polyester composition of claim 1 further comprising a flame retardant agent selected form the group consisting of: bromine or chlorine containing compounds, sulfonate salts, organo-phosphates, fluorinated polymers or mixtures thereof.

16. A weatherable high modulus resorcinol based polyester composition comprising; 40–99% of a resorcinol based polyester carbonate and 1–60% of a fiber wherein the composition has a flexural modulus, as measured by ASTM D790, of greater than or equal to about 300,000 psi, and wherein the composition has an initial 60 degree gloss value, measured according to ASTM D523, of greater than or equal to 70%; and wherein the composition has greater than or equal to 50% retention of said initial gloss after 3,000 KJ/m² accelerated weathering.

* * * * *